United States Patent [19]
Talat et al.

[11] Patent Number: 5,140,451
[45] Date of Patent: Aug. 18, 1992

[54] AIRCRAFT SIGNAL DISTRIBUTION SYSTEM

[75] Inventors: Kausar Talat, Bellevue; Robert I. Morefield, Auburn, both of Wash.

[73] Assignee: The Boeing Company, Seattle, Wash.

[21] Appl. No.: 311,656

[22] Filed: Feb. 15, 1989

[51] Int. Cl.$^5$ .................. H04B 10/24; H04J 14/02
[52] U.S. Cl. .................. 359/114; 359/124; 359/131
[58] Field of Search .................. 370/3, 1, 4; 455/601, 455/600, 602, 606, 612, 613, 617; 318/564; 359/114, 124, 131, 127, 123

[56] References Cited

U.S. PATENT DOCUMENTS

| | | | |
|---|---|---|---|
| 4,422,180 | 12/1983 | Wendt | 455/612 |
| 4,525,834 | 6/1985 | Schenkel et al. | 370/3 |
| 4,557,553 | 12/1985 | McLandrich | 370/1 |
| 4,641,371 | 2/1987 | Shutterly | 455/601 |
| 4,736,359 | 4/1988 | Cohen et al. | 370/3 |
| 4,747,094 | 5/1988 | Sakaguchi et al. | 455/601 |
| 4,834,481 | 5/1989 | Lawson et al. | 370/3 |

FOREIGN PATENT DOCUMENTS

| | | | |
|---|---|---|---|
| 0090232 | 4/1988 | Japan | 370/1 |
| 0148726 | 6/1988 | Japan | 370/3 |
| 0227226 | 9/1988 | Japan | 370/3 |
| 0312732 | 12/1988 | Japan | 370/3 |

*Primary Examiner*—Edward L. Coles, Sr.
*Assistant Examiner*—Kinfe-Michael Negash
*Attorney, Agent, or Firm*—Seed and Berry

[57] ABSTRACT

An aircraft signal distribution system communicates electrical signals between a first station in an aircraft and a second station in the aircraft. The two stations are connected by at least partially redundant optical cables which can transmit signals between the two stations within two or three optical spectral windows. By wavelength division multiplexing (WDM), the signals to be communicated can be placed on independent, closely spaced spectral intervals within the spectral windows. The signals which are transmitted through the cables to a station are converted back to electrical signals for use by electrical devices at or near that station.

12 Claims, 3 Drawing Sheets

AIRCRAFT SIGNAL DISTRIBUTION SYSTEM

REFERENCE TO RELATED APPLICATION

This application is related to U.S. patent application No. 01/475,861, "System and Method for Structural Monitoring Using Optical Imaging," invented by Allan Johnson and Donald Woodbridge

DESCRIPTION

1. Technical Field

This invention relates to a signal distribution system for use in an aircraft and, more particularly, to a signal distribution system for communicating signals through fiberoptical channels within the aircraft.

2. Background Art

The need to communicate signals from one electrical device to another within an aircraft has been a topic of great interest in recent years. For example, aircraft control systems, based on the transmission of electrical signals from the aircraft cockpit to electrical receivers near the aircraft control surfaces, have been used to transmit control signals for the purpose of controlling the aircraft. Such systems, frequently known as "fly by wire" systems, are replacing mechanical actuation systems.

Likewise, it is becoming common for electrical signals produced by sensors located throughout the aircraft to be transmitted to a central location on board the aircraft for further processing. Such systems can, for example, provide information concerning the operating environment of an aircraft and/or the presence and location of potential threats to the central location. A computer located at the central location can be used to "fuse" the information for presentation to members of the aircraft crew.

In other applications, it is common for a bidirectional electrical signaling system to be used both to send commands from the aircraft crew to a remote location on the aircraft and to send reports from the remote location to the aircraft crew. The signaling system between an aircraft crew and the aircraft's weapons stores location is one example of such a system.

Because of their critical nature, such electrical interconnection systems have been subjected to various military standards. For example, an aircraft/store electrical interconnection system is subject to Military Standard 1760A. This standard was deemed necessary because trends in store technology were predicted to lead to insurmountable aircraft/store interfacing problems. These predicted problems arise because of the increasing amounts of data and other required control information received from avionics systems and because of the trend toward more complex store functions.

One difficulty with electrical signaling systems on an aircraft is that they are subject to the disruptive effects of several outside influences. They also produce electromagnetic fields which can interfere with other electrical systems on the aircraft and can also be intercepted externally to the aircraft Military Standard 1760A is primarily directed toward providing electrical interconnections for high-bandwidth analog and RF signals, redundant multiplex data bus signals and low-bandwidth analog and video signals, as well as a variety of addressing and power lines. However, it also provides for two fiberoptic signal lines which will not be used until military fiberoptic standards evolve.

It has been recognized that optical communications have several advantages on board an aircraft, including less susceptibility to external electromagnetic interference and cross talk. In addition, fiberoptic communications are secure, since they do not produce external fields. One such system is disclosed by Caouette et al. in U.S. Pat. No. 4,161,650.

Fiberoptic communication systems are capable of extremely high data rates, which can be used with a variety of multiplexing schemes to allow the contemporaneous transmission of many channels of information. In addition, optical fibers allow the simultaneous transmission of bidirectional signals. For these reasons, fiberoptic communications can be accomplished over cables which are significantly lighter and smaller than their counterpart electrical components. Therefore, in addition to the advantages outlined above, it is possible to improve the reliability of a fiberoptic signal distribution system by providing redundant optical fibers while taking up less volume and adding less weight than a counterpart electrical systems.

Present fiberoptic communication technology is based upon three primary wavelength "windows." One window is located at a wavelength of approximately 850 nanometers, while another is located at approximately 1300 nanometers. The wide use of these wavelength windows is primarily due to the fact that the technology for these windows has matured, so that the components are low in cost and readily available. In particular, the light at these two wavelengths can be produced by light-emitting diodes (LEDs) very reliably and stably. Likewise, photodetectors operating at these two wavelength windows are both inexpensive and readily available. A third optical window, at a wavelength of 1550 nanometers, while presently available, depends upon the use of laser diodes. However, such laser diodes are not being used in airborne applications because of their instability, linearity variations, and temperature and vibration sensitivity.

Fiberoptic communications systems based on wavelength division multiplexing (WDM) have been proposed in the past, as, for example, in d'Auria et al U.S. Pat. No. 3,953,727. However, the inventors know of no optical aircraft signal distribution system which takes advantage of the decreased size of optical fibers to provide improved system reliability through the use of redundant optical fibers while decreasing the size and weight of the signal distribution system.

It is therefore desirable to provide an aircraft signal distribution system capable of the bidirectional transmission of signals between two stations in an aircraft through redundant optical fiber channels.

DISCLOSURE OF THE INVENTION

It is an object of the present invention to provide an aircraft signal distribution system for communicating between two stations in an aircraft.

It is another object of the present invention to provide an aircraft signal distribution system for communicating signals between two stations on an aircraft through optical fibers.

It is a further object of the present invention to provide an aircraft signal distribution system having two optical fibers carrying redundant signals.

It is a still further object of the present invention to provide an aircraft signal distribution system for bidirectionally distributing signals between a first station and a second station.

one aspect of the invention involves a signal distribution system for communicating electrical signals between a first station in an aircraft and a second station in the aircraft. The signal distribution system comprises a first optical cable and a second optical cable, both cables being connected between the first and second stations. In addition, the signal distribution system comprises first and second conversion means respectively located at the first and second stations and connected to the first and second optical cables for converting the electrical signals communicated from one station to optical signals and for converting the optical signals communicated from the other station into electrical signals.

Another aspect of the invention provides a signal distribution system for communicating first and second sets of signals between a first station in an aircraft and a second station in the aircraft. The first set of signals are transmitted at a substantially higher rate than the second set of signals. The signal distribution system comprises first and second optical channels between the first and second stations. Each optical channel includes a first optical cable connected between the first and second stations and a pair or receiving/transmitting means located at each end of the optical cable. Each of the receiving/transmitting means comprises means for converting one of the sets of signals to optical signals having a particular wavelength, transmission means for bidirectionally transmitting the first optical signals between a first and second stations, and transducer means for converting the optical signals to received signals.

BEST MODES FOR CARRYING OUT THE INVENTION

Figure 1:
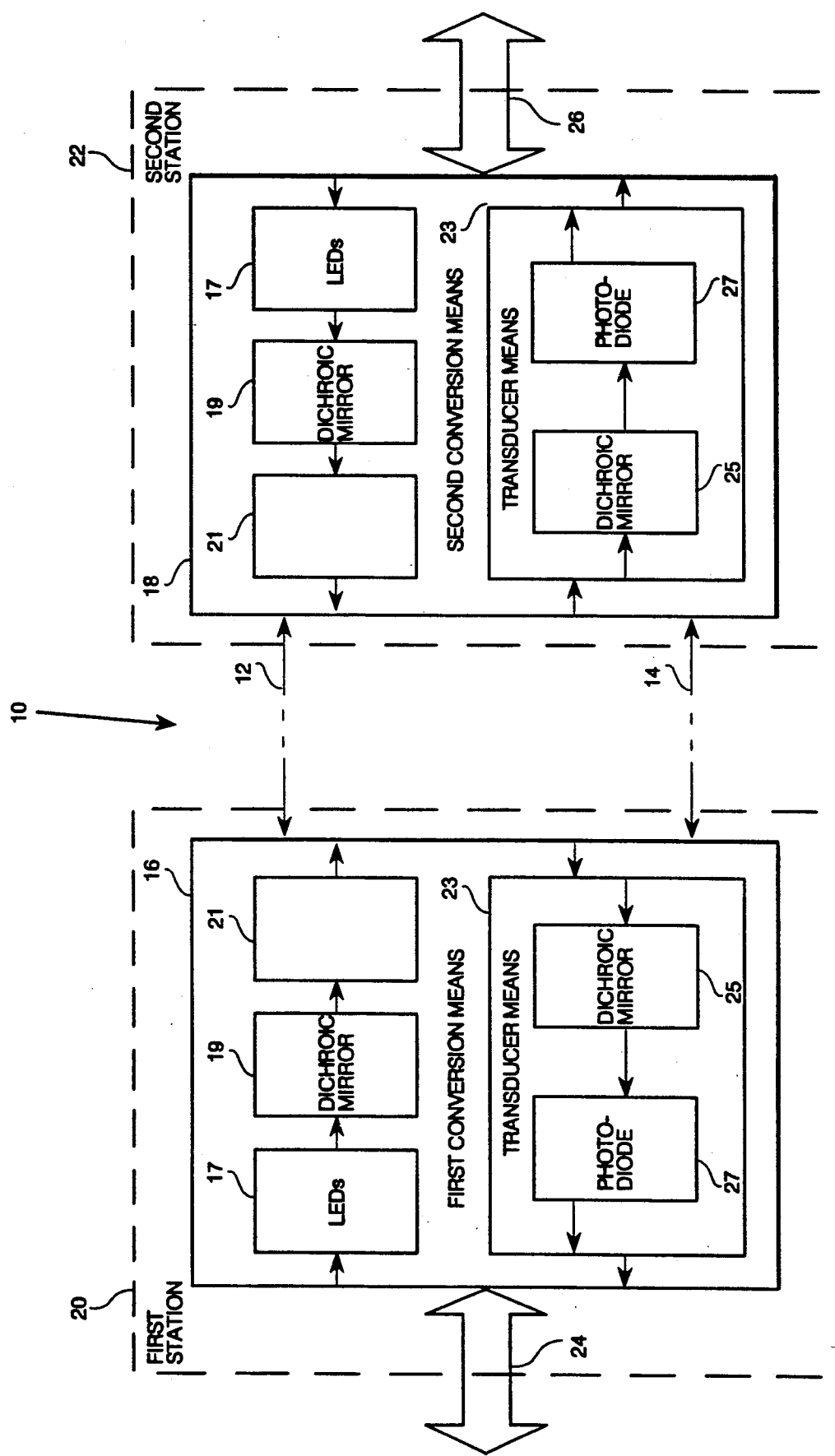
FIG. 1 is a schematic diagram of a first embodiment of the aircraft signal distribution system of the present invention.

Referring to FIG. 1, a first embodiment of the aircraft signal distribution system 10 of the present invention includes first and second optical cables 12 and 14 connected between first and second conversion means 16 and 18. As shown schematically, first conversion means 16 is located at a first station 20 and second conversion means 18 is located at a second station 22. For purposes of illustration, first station 20 can be located in the vicinity of an on-board computer system (not shown), while second station 22 can be located in the vicinity of the aircraft's weapons stores. A first set of signals 24, at the first station 20, is communicating between the first conversion means 16 and an external receiver/transmitter of signals, such as the airborne computer system. Similarly, a second set of signals 26 is communicating between the second conversion means 18 at the second location 22 and an external receiver/transmitter of signals, such as electronics systems controlling the aircraft's weapons stores. The first and second sets of signals, 24 and 26, which are electrical signals, can include both serial and parallel signals to be received from or transmitted to the respective conversion means 16 and 18.

Each of the first and second optical cables 12 and 14 can be made from multimode, graded index fibers having a 100 micron core and a 140 micron cladding. Although the optical cables 12 and 14 can have any length, typically they will each have a length of at least 100 meters. Optical fibers, such as those described above, are capable of simultaneous bidirectional transmission of signals, i.e., transmission from the first station 20 to the second station 22 at the same time as transmission from the second station 22 to the first station 20.

Each of the first and second conversion means 16 and 18 are conventional systems containing such conventional components as light emitting diodes (LEDs) 17 operating at a particular wavelength, a dichroic mirror 19 tuned to that wavelength, and collimating lenses 21 to convert an electrical signal corresponding to one signal in the set of signals to be communicated to a corresponding optical signal in the optical cable. Such a typically system is disclosed in the abovementioned patent to d'Auria et al., which also discloses the transmission means for collimating the light produced by the LED 17 and reflected by the dichroic mirror 19 onto one end of the optical fiber for communication to its other end. Further, the patent issued to d'Auria et al. discloses conventional transducer means 23, contained within the receiving/transmitting means for converting the transmitted optical signal to receive electrical signals. The transducer can include a dichroic mirror 25 and photodiode (or pin diode) 27 which are sensitive to the transmitted wavelength and which produce a corresponding electrical signal.

Optical fibers can transmit information in a variety of forms, including intensity modulation, frequency modulation, pulse code modulation and pulse width modulation. Therefore, depending upon the operational characteristics of the signal distribution system being used, one particular means of transmitting the optical signals may be preferred over the others. The first and second conversion means 16 and 18 can, accordingly, also include circuitry for converting the first and second sets of electrical signals 24 and 26 into appropriate forms before they are converted to optical signals.

Figure 2:
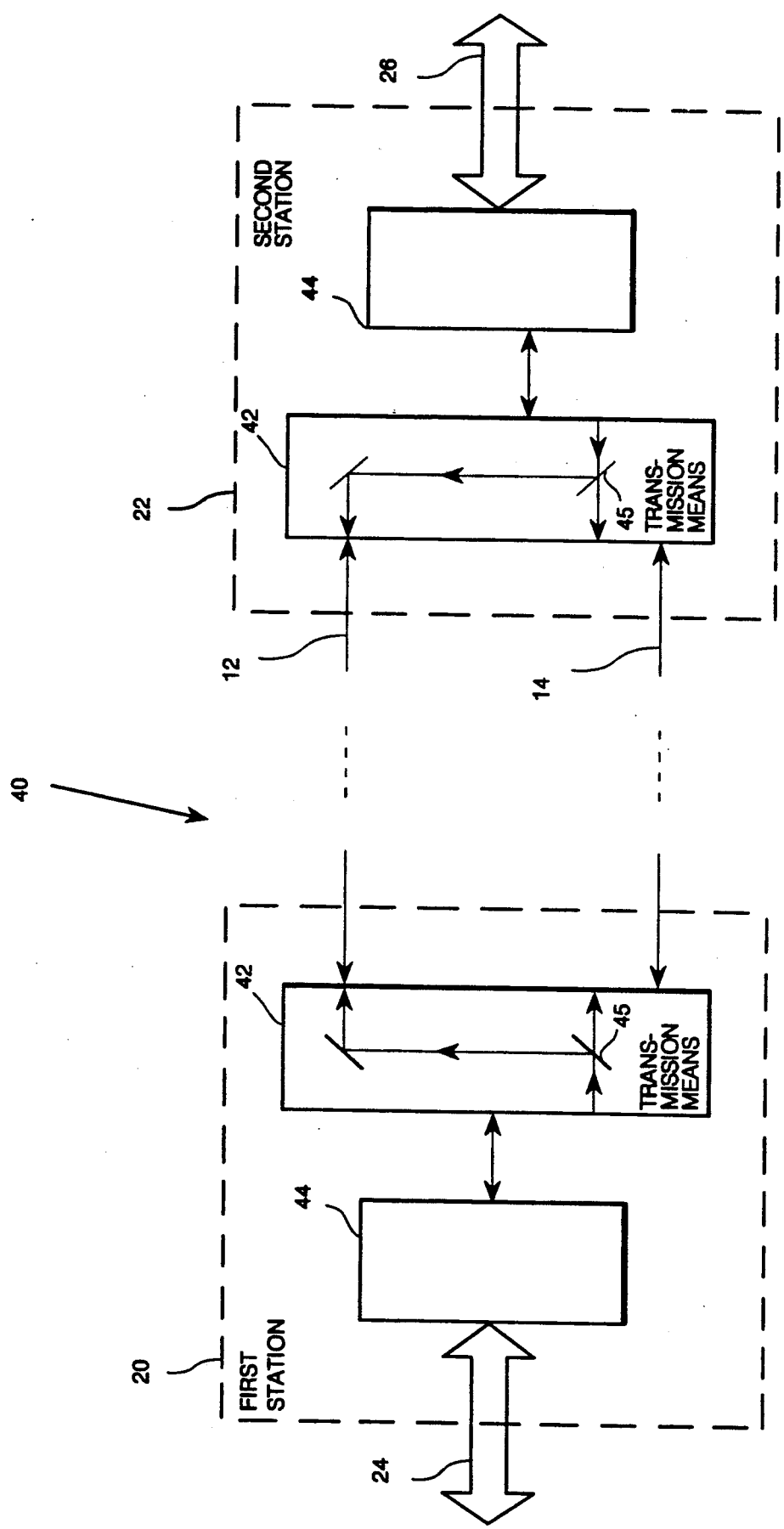
FIG. 2 is a schematic diagram of a second embodiment of the aircraft signal distribution system of the present invention.

Referring now to FIG. 2, a second embodiment of the aircraft signal distribution system of the present invention is indicated by the reference numeral 40. The components found at each of the first and second stations 20 and 22 include a transmission means 42 and a wavelength division multiplexer/demultiplexer (WDM/D) 44. WDM/D 44 can include sources of optical energy that can be controlled by the electrical signals contained in the first and second signal sets 24 and 26. It can also include dichroic mirrors tuned to reflect the wavelengths transmitted by a corresponding light source and can be used to direct the light from a particular LED into the transmission means 42 or can receive light energy from the transmission means 42. This causes the light to be directed toward a photodiode, for conversion back to an electrical signal A number of other possible forms of WDM/D 44 are also possible, as will be appreciated by those skilled in the art.

The transmission means 42 contained at the first and second stations 20 and 22 split the outgoing optical beam produced by the WDM/D 44, causing a portion to be transmitted on the first optical cable 12, while the remainder is transmitted on the second optical cable 14. Transmission means 42 also combines the optical energy it receives from the first and second optical cables 12 and 14 into a single optical beam which is then transmitted to the WDM/D 44. One suitable means for the transmission means 42 is a partially transmissive mirror 45 which splits an outgoing beam of light energy into two beams, one for each of the two optical cables 12 and 14. Other conventional forms of transmission means 42 are known to those skilled in the art.

The WDM/D 44 shown in FIG. 2 is particularly useful for converting the sets of signals to be communicated into a number of closely spaced spectral intervals contained within either of the 850-nanometer or 1300-nanometer spectral windows. In one scheme, it has been found possible to transmit four signals on each of the 850- and 1300 nanometer spectral windows In particular, the four wavelengths in the 850-nanometer interval can be chosen at 745, 785, 825, and 865 nanometers, allowing a separation of 40 nanometers between adjacent optical frequencies. Similarly, four signals can be placed in the 1300-nanometer spectral window at 1230, 1270, 1310 and 1350 nanometers, although spacing as close as 5 nanometers is possible in single mode fibers which increase the number of transmittable channels in one fiber.

Both of the embodiments of the aircraft signal distribution system shown in FIGS. 1 and 2 offer the advantages of low cross talk between adjacent channels, low susceptibility to external electromagnetic effects and high security from external surveillance. In addition, they offer significant reliability because of their redundant nature. Since the signals that are transmitted on both first and second optical cables 12 and 14 are received and treated in the same way, either one of the two optical cables 12 or 14 can individually supply the transmitted signals Therefore, if one of the two cables should become inoperative, for example, by being broken or punctured, the other cable will serve to transmit the signals from one station to the other. Such breakage can be detected and reported to a reliability monitor contained in either of the conversion means 16 or 18 (in FIG. 1) or the WDM/D 44. The signal from the reliability monitor can be transmitted back to a monitoring component, for example, a computer attached to the first set of signals 24.

Figure 3:
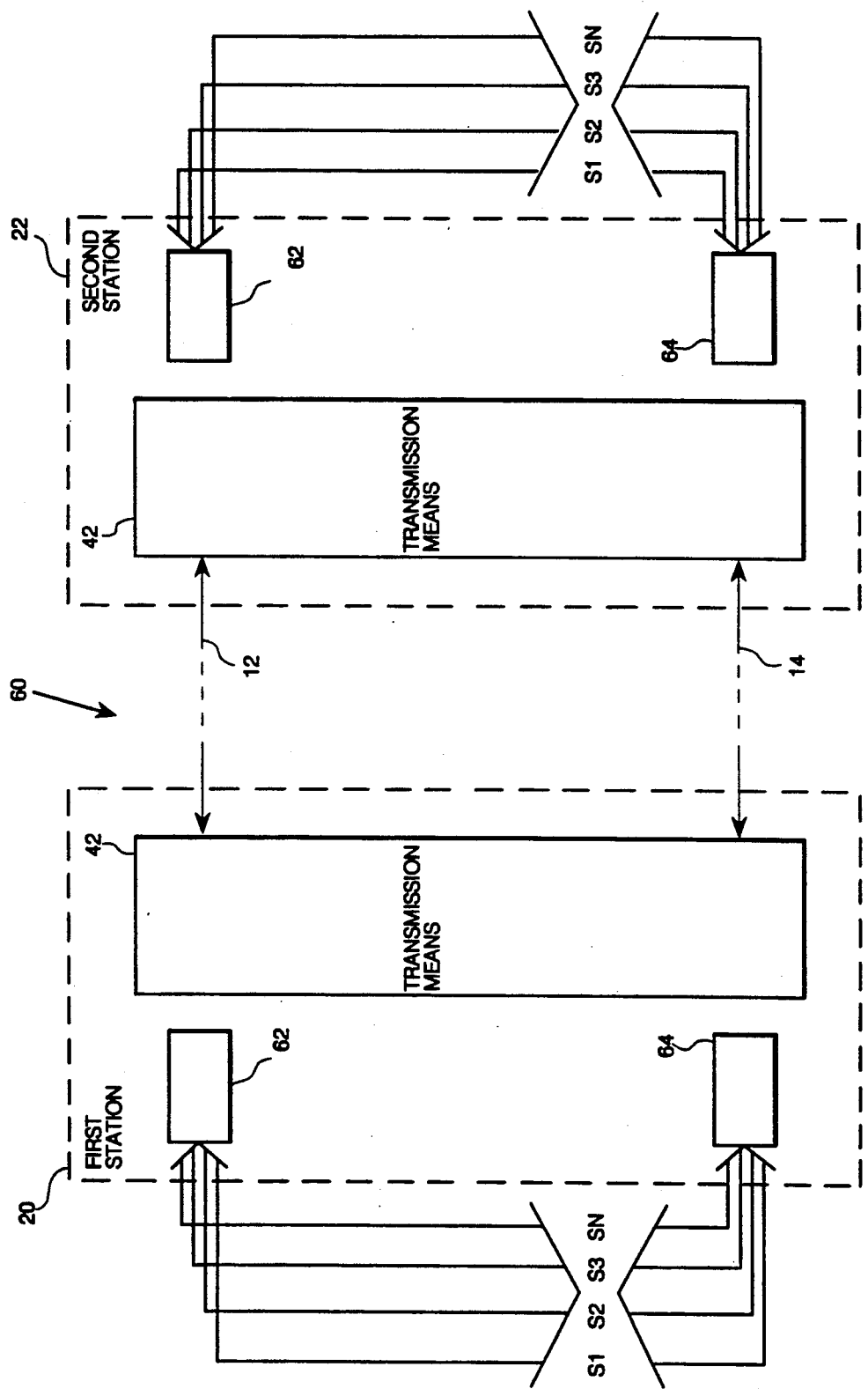
FIG. 3 is a schematic diagram of a third embodiment of the aircraft signal distribution system of the present invention.

A third embodiment of the aircraft signal distribution system in the present invention is shown in FIG. 3. The system 60, which connects the first and second stations 20 and 22, contains two wavelength division multiplexers/demultiplexers 62 and 64 and transmission means 42. WDM/Ds 62 and 64, which can each independently operate also as demultiplexers, produce optical signals corresponding to the input signals s1, s2, s3, . . . sN. WDM/D 62 produces optical signals at one spectral window, i.e., the 850-nanometer window, while WDM/D 64 can produce optical signals at the 1300-nanometer spectral window. The transmission means 42 receives the signals produced by the WDM/Ds 62 and 64 and sends those operating at the 850-nanometer spectral window over both the first and second optical cables 12 and 14. The WDM/D 64, however, produces signals which are transmitted only over the second optical cable 14. In this way, the most important signals can be redundantly transmitted over both first and second optical cables 12 and 14, while other less important signals can be sent over only a single optical cable 12 or 14. In addition, second optical cable 14, which is implemented to transmit optical signals within both the 850- and 1300-nanometer spectral windows, can use the 1300-nanometer optical signals to transmit very high data rate signals, such as video signals, whereas the 850-nanometer signals can be used to transmit the lower-data rate signals. The WDM/Ds 62 and 64 can also be organized to detect when one of the two optical cables 12 or 14 has failed, and to issue a report to a reliability monitor which is located remotely from the aircraft's signal distribution system.

While the detailed description above has been expressed in terms of specific examples, those skilled in the art will appreciate that many other signal distribution systems could be used to accomplish the purposes of the disclosed inventive apparatus. Accordingly, it can be appreciated that various modifications of the above-described embodiments may be made without departing from the spirit and the scope of the invention. In particular, if it is desired to have coherent communication from one station in the aircraft to the other, the optical fibers connecting the two stations can be operated with wavelength division multiplexed signals operating in the 1550-nanometer wavelength spectral window, whereby coherent light signals in the conversion means are produced by modulation of the coherent laser diodes operating in that spectral window Therefore, the spirit and scope of the present invention are to be limited only by the following claims.

We claim:

1. A signal distribution system for communicating electrical signals between a first station in an aircraft and a second station in the aircraft, the signal distribution system comprising:
    a first optical cable connected between the first and second stations, the first optical cable having first and second ends,
    a second optical cable connected between the first and second stations, the second optical cable having third and fourth ends,
    first conversion means located at the first station and connected to the first end of the first optical cable and to the third end of the second optical cable for converting the electrical signals communicated from the first station into first optical signals and for converting optical signals communicated from the second station into electrical signals at the first station, and
    second conversion means located at the second station and connected to the second end of the first optical cable and to the fourth end of the second optical cable for converting the electrical signals communicated from the second station into second optical signals and for converting optical signals communicated from the first station into electrical signals at the second station,
    wherein the optical signals communicated through the first optical cable are contained within a first range of optical wavelengths and the optical signals communicated through the second optical cable are contained within a second range of optical wavelengths which differs from the first range of optical wavelengths.

2. The signal distribution system of claim 1 wherein the first conversion means includes a first wavelength division multiplexer/demultiplexer for converting the electrical signals communicated from the first station into the first optical signals and for converting the first optical signals into electrical signals and wherein the second conversion means includes a second wavelength division multiplexer/demultiplexer for converting the electrical signals communicated from the second station into the second optical signals and for converting the second optical signals into electrical signals.

3. A signal distribution system for transmitting information in the form of first and second sets of electrical signals between a first station in an aircraft and a second station in the aircraft, the first set of electrical signals being transmitted at a substantially higher rate than the second set of electrical signals, the signal distribution system comprising:

a first optical channel between the first and second stations, including
   a first optical cable connected between the first and second stations, the first optical cable having first and second ends,
   a pair of receiving/transmitting means, one of said receiving/transmitting means being located at each of said first and second ends of said first optical cable, each of the receiving/transmitting means comprising:
   conversion means for converting the first set of electrical signals to first optical signals having a first wavelength,
   transmission means for bidirectionally transmitting the first optical signals between the first and second stations, and
   transducer means for converting the first optical signals to first received electrical signals; and a second optical channel between the first and second stations, including
   a second optical cable connected between the first and second stations, the second optical cable having first and second ends,
   a pair of receiving/transmitting means, one of said receiving/transmitting means being located at each of said first and second ends of said second optical cable, each of the receiving/transmitting means comprising:
   conversion means for converting the second set of electrical signals to second optical signals having a second wavelength that is longer than the first wavelength,
   transmission means for bidirectionally transmitting the second optical signals between the first and second stations, and
   transducer means for converting the second optical signals to second received electrical signals.

4. The signal distribution system of claim 3 wherein each of the conversion means comprises a wavelength division multiplexer, each of the transmission means comprises a light emitting semiconductor device, and each of the transducer means comprises a wavelength division demultiplexer.

5. A signal distribution system for transmitting information in the form of first and second sets of electrical signals between a first station in an aircraft and a second station in the aircraft, the first set of electrical signals being transmitted at a substantially higher rate than the second set of electrical signals, the distribution system comprising:

a first optical channel between the stations, including;
   a first optical cable connected between the stations, the first optical cable having first and second ends,
   conversion means for converting the first set of electrical signals to first optical signals having a first wavelength, the conversion means being located at the first end of the first optical cable,
   transmission means for bidirectionally transmitting the first optical signals between the stations, the transmission means being located at the first end of the first optical cable, and
   transducer means for converting the first optical signals to first received signals, the transducer means being located at the second end of the first optical cable; and a second optical channel between the first and second stations, including
   a second optical cable connected between the stations, the second optical cable having first and second ends,
   conversion means for converting the second set of electrical signals to second optical signals having a second wavelength that is longer than the first wavelength, the conversion means being located at the first end of the second optical cable,
   transmission means for bidirectionally transmitting the second optical signals between the stations, the transmission means being located at the first end of the second optical cable, and
   transducer means for converting the second optical signals to second received signals, the transducer means being located at the second end of the second optical cable.

6. A signal distribution system for an aircraft, comprising:
   first conversion means for converting a first input electrical signal to a first plurality of parallel optical output signals including:
   at least one light emitting device responsive to the first input electrical signal for generating an optical output signal of a predetermined wavelength;
   a dichroic mirror tuned to the wavelength for receiving the optical signal from the light emitting device and directing the optical signal to at least one fiber of the plurality of optical fibers; and
   a plurality of collimating lenses, one lens associated with each optical fiber, for channeling the optical output signal from the mirror onto the respective fiber;
   a plurality of optical fibers, each fiber being connected to the first conversion means for receiving one of the parallel optical output signals; and
   second conversion means connected to all of the plurality of optical fibers for reconverting the parallel optical signals into a first output electrical signal, wherein the optical fibers provide redundant optical paths between the first and second conversion means and wherein the second conversion means is responsive to any one or more received optical signal to produce the first output electrical signal.

7. The system of claim 6 wherein the light emitting device is a light emitting diode (LED).

8. The system of claim 6 wherein the light emitting device is a laser diode.

9. A signal distribution system for an aircraft, comprising:
   first conversion means for converting a first input electrical signal to a first plurality of parallel optical output signals, including: a first generator means responsive to the first input electrical signal for generating a first optical output signal of a first distinct wavelength and a second generator means responsive to the first input electrical signal for generating a second optical output signal of a second distinct wavelength;

a plurality of optical fibers, each fiber being connected to the first conversion means for receiving one of the parallel optical output signals;

second conversion means connected to all of the plurality of optical fibers for reconverting the parallel optical signals into a first output electrical signal, wherein the optical fibers provide redundant optical paths between the first and second conversion means and wherein the second conversion means is responsive to any one or more received optical signal to produce the first output electrical signal;

first means for channeling the first optical output signal to a first optical fiber of the plurality; and second means for channeling the second optical output signal to a second optical fiber of the plurality, wherein parallel optical signals of different wavelength are transmitted between the first and second conversion means on separate optical fibers.

10. The system of claim 9 wherein the second conversion means includes a first wavelength conversion means tuned to the first wavelength connected to the first fiber for converting the first optical output signal to one output electrical signal in the first output electrical signal;

a second wavelength conversion means tuned to the second wavelength and connected to the second fiber for converting the second optical output signal to another output electrical signal in the first output electrical signal; and means for transmitting one or the other or both of the output electrical signals in the first output electrical signal.

11. The system of claim 10 wherein the first conversion means includes a wavelength division multiplexer for converting the first input electrical signal into the plurality of parallel optical output signals and wherein the second conversion means includes a wavelength division demultiplexer for converting at least one of the parallel optical output signals into the output electrical signal.

12. A signal distribution system for an aircraft, comprising:

first conversion means for converting a first input electrical signal to a first plurality of parallel optical output signals, the first conversion means reconverting parallel optical signals received from the plurality of optical fibers into a first output electrical signal, a plurality of optical fibers, each fiber being connected to the first conversion means for receiving one of the parallel optical output signals, the plurality of optical fibers being capable of transmitting optical signals bidirectionally; and second conversion means connected to all of the plurality of optical fibers for reconverting the parallel optical signals into a second output electrical signal, the second conversion means converting a second input electrical signal to a second plurality of parallel optical output signals, wherein the optical fibers provide redundant optical paths between the first and second conversion means and wherein the second conversion means is responsive to any one or more received optical signal to produce the first output electrical signal.

* * * * *